US 9,877,497 B2

(12) United States Patent
Fillekes et al.

(10) Patent No.: US 9,877,497 B2
(45) Date of Patent: Jan. 30, 2018

(54) KIT FOR MAKING ICE CREAM CAKE

(71) Applicants: Matthew Morris Fillekes, Northport, NY (US); Jennifer Elizabeth Engel-Fillekes, Northport, NY (US)

(72) Inventors: Matthew Morris Fillekes, Northport, NY (US); Jennifer Elizabeth Engel-Fillekes, Northport, NY (US)

( * ) Notice: Subject to any disclaimer, the term of this patent is extended or adjusted under 35 U.S.C. 154(b) by 187 days.

(21) Appl. No.: 14/997,785

(22) Filed: Jan. 18, 2016

(65) Prior Publication Data
US 2016/0128354 A1 May 12, 2016

Related U.S. Application Data

(62) Division of application No. 13/959,857, filed on Aug. 6, 2013.

(51) Int. Cl.
*A23G 9/22* (2006.01)
*A23G 9/44* (2006.01)

(52) U.S. Cl.
CPC ............... *A23G 9/221* (2013.01); *A23G 9/44* (2013.01)

(58) Field of Classification Search
CPC ................................. A23G 9/221; B29C 33/48
See application file for complete search history.

(56) References Cited

U.S. PATENT DOCUMENTS

| | | |
|---|---|---|
| 149,867 A | 4/1874 | Kelleher et al. |
| 424,370 A | 3/1890 | Stasch |
| 854,592 A | 5/1907 | Nelson |
| 1,340,659 A | 5/1920 | Lewitzky |
| 1,518,973 A | 12/1924 | Edwards |
| 1,531,569 A | 3/1925 | Rade |
| 1,567,234 A | 12/1925 | Brucker |
| 1,713,577 A | 5/1929 | Wentorf |
| 1,727,257 A | 9/1929 | Stratton et al. |
| 1,852,966 A | 4/1932 | Green |
| 2,030,344 A | 2/1936 | Young |
| 2,165,941 A | 7/1939 | Price |
| 2,567,091 A | 9/1951 | Whitnah et al. |
| 3,262,668 A | 7/1966 | Luker |
| 3,358,619 A | 12/1967 | Pareira |
| 3,700,204 A | 10/1972 | Swett et al. |
| 3,730,579 A | 5/1973 | Mock |
| 3,758,143 A | 9/1973 | Godlewski |
| 4,205,870 A | 6/1980 | Conner |
| 4,245,973 A | 1/1981 | Greaney |
| 4,644,858 A | 2/1987 | Liotto et al. |
| 4,784,598 A * | 11/1988 | Kranz .................... B44D 3/105 15/105.5 |
| 5,176,072 A | 1/1993 | Larson |
| 5,537,917 A | 7/1996 | Schiffer et al. |
| 5,678,475 A | 10/1997 | Otero |
| 6,012,227 A * | 1/2000 | Lent ...................... A47J 43/281 15/236.01 |

(Continued)

*Primary Examiner* — James Sanders
(74) *Attorney, Agent, or Firm* — Law Offices of Leo Mikityanskiy, P.C.; Leonid Mikityanskiy

(57) ABSTRACT

An inexpensive, cost-effective kit for making ice cream cakes with interchangeable ice cream cake molds. The ice cream cake kit allows the user to simply, quickly, and inexpensively create ice cream cakes of varying sizes and shapes in the home environment by simply changing the ice cream cake molds used with a tray that serves as the bottom of the ice cream cake form and a serving tray.

12 Claims, 6 Drawing Sheets

(56) References Cited

U.S. PATENT DOCUMENTS

| | | | |
|---|---|---|---|
| 6,024,391 A | 2/2000 | Horn | |
| 7,163,185 B2 | 1/2007 | Dail | |
| 7,543,350 B2 * | 6/2009 | Cheney | E04F 21/06 15/210.1 |
| 8,250,701 B1 * | 8/2012 | Forsline | B44D 3/00 15/114 |
| 2003/0234188 A1 | 12/2003 | McGuyer | |
| 2003/0234205 A1 | 12/2003 | McGuyer et al. | |
| 2006/0175527 A1 | 8/2006 | Morgan | |
| 2010/0260909 A1 | 10/2010 | McPheron et al. | |
| 2012/0067228 A1 | 3/2012 | Hale | |

* cited by examiner

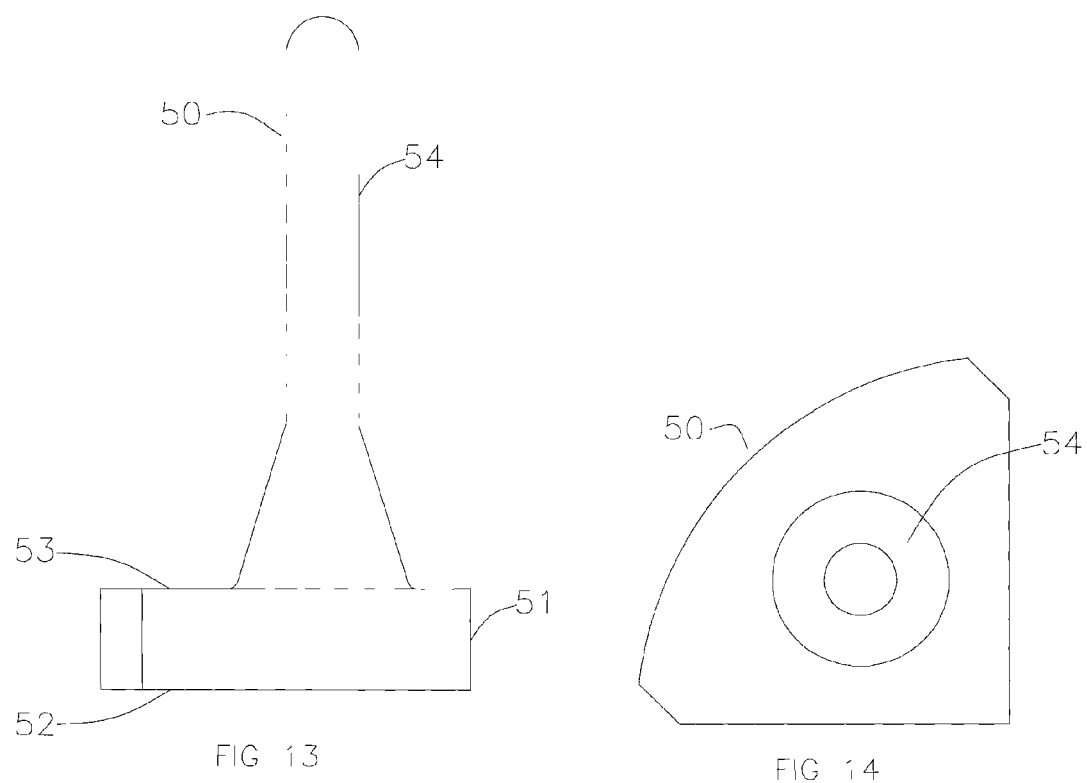

US 9,877,497 B2

1
KIT FOR MAKING ICE CREAM CAKE

BACKGROUND

This invention relates to making ice cream cakes in a home environment. Using the ice cream cake form and kit of the present invention, anyone can make a fresh, delicious ice cream cake with just a handful of inexpensive ingredients. Although primarily aimed at home use, the ice cream cake form and kit for making ice cream cake of the present invention can also be successfully used in small candy and ice cream shops for manufacturing fresh ice cream cakes of different shapes to order.

Ice cream cakes are popular with children and adults alike, and are sold as summer refreshments and birthday cakes with fanciful and vanity shapes, and frequently with birthday or event-themed decorations and designs. Currently, ice cream cakes are available from specialty shops and several supermarket store chains, but these pre-made ice cream cakes are often expensive, especially the larger cakes.

In addition to being expensive, these pre-made ice cream cakes do not allow the buyers any control over the contents of the ice cream cake. The buyers can select from several existing types of cakes, and buy an ice cream cake with already formed contents. Thus, the buyers at best only have control over the toppings that go on the ice cream cake.

DESCRIPTION OF PRIOR ART

The current state of the art involves manufacturing ice cream cakes at factories or specialty shops. The contents, such as ice cream and other ingredients, are pre-determined by the manufacturers, in a set, limited number of varieties.

What is needed is an easy-to-use, easy-to-make, and easy-to-clean reusable form for manufacturing ice cream cakes of varying shapes, sizes, and with whatever ice cream and other ingredients or content the users want, From the simple three-layer plain vanilla ice cream with a cookie layer middle, to the multi-layer gourmet chocolate ice-cream with almonds, crumbled wafers, and maraschino cherries— any number of varieties, layers, and ingredients can be implemented in cakes of different sizes and shapes using the ice cream cake form and kit of the present invention. Making the ice cream cake then becomes a fun activity for the entire family: create your dream ice cream cake or the masterpiece work of art cake.

SUMMARY

This invention meets the current need for such an ice cream form. A novel ice cream cake form and a kit for making ice cream cake are provided. The preferred embodiment of the ice cream cake form of the present invention is a substantially flat tray with grooves capable of accommodating at least two removable ice cream cake molds of different shapes and sizes, which allow easy creation of ice cream cakes in the home environment.

The upper part of the ice cream cake form, specifically the ice cream cake mold, is preferably removably attachable to the substantially flat tray for the ease of removing the mold and serving the cake, easy cleaning, and easy selection of the cake size and shape. The preferred method of attachment of the removable molds to the tray is snapping or sliding the molds into cooperating, grooves in the substantially flat tray. However, other methods of attachment may he used, such as latches and other means known in the art.

DRAWINGS

These features, aspects and advantages of the novel ice cream cake form and a kit for making ice cream cake will become further understood with reference to the following description and accompanying drawings where FIG. 1 is an exploded perspective view of the ice cream cake tray and the removable separating rectangular ice cream cake mold of the present invention;

Figure 10:
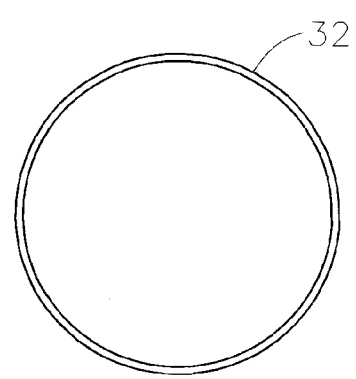
FIG. 10 is a top down view of the one-piece rigid removable circular ice cream cake mold of the present invention.

FIG, 12 is a perspective view of the one-piece rigid removable circular ice cream cake mold of the present invention illustrated in FIG. 10;

FIG. 13 is a side view of the molding tool of the kit for making ice cream cake of the present invention;

FIG. 14 is a top view of the molding tool of the kit for making ice cream cake of the present invention illustrated in FIG. 13; and

DESCRIPTION

Figure 1:
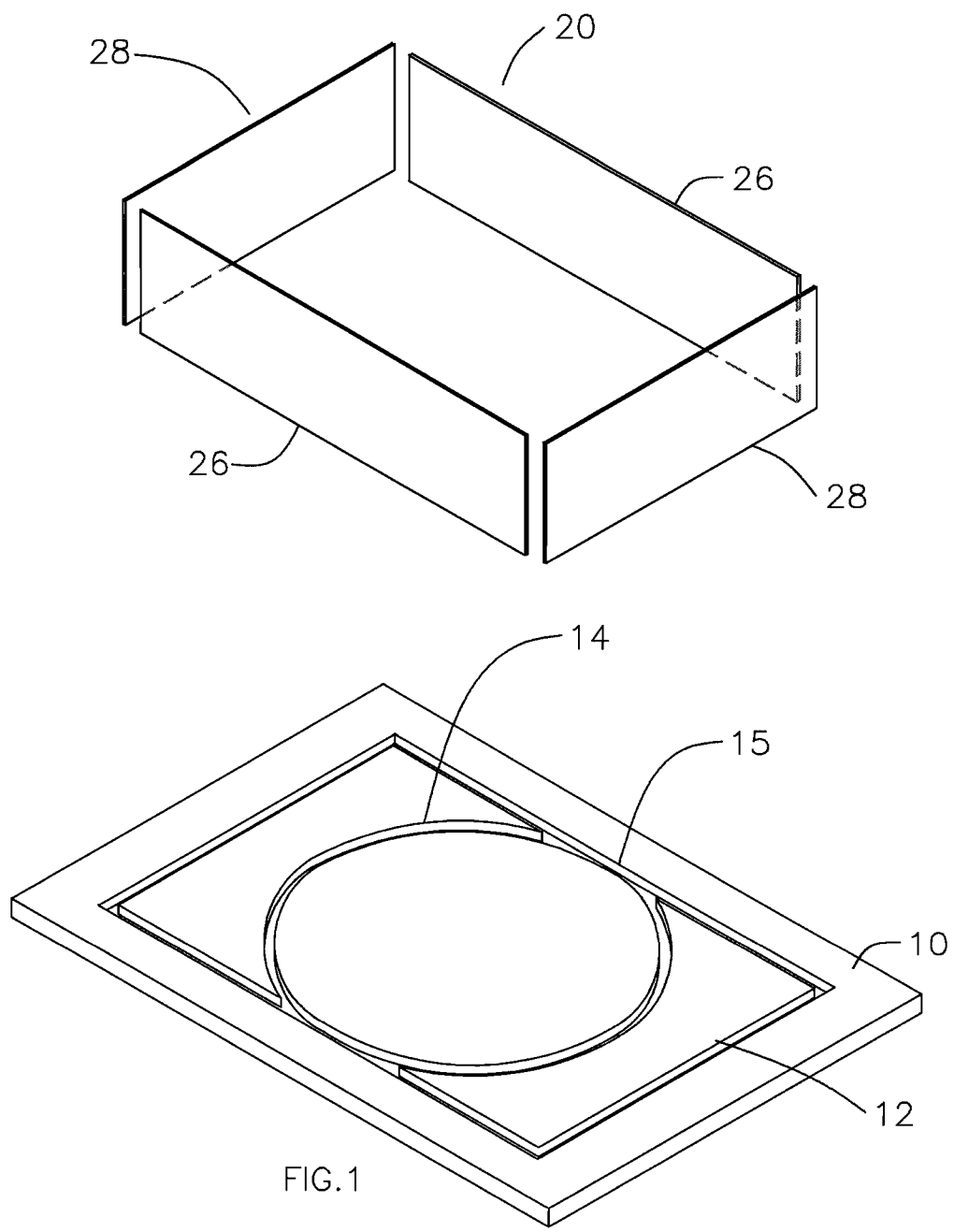

As illustrated in FIG. 1, the novel ice cream cake form of the present invention comprises an ice cream cake tray 10 and at least one removable ice cream mold, illustrated in FIG. 1 as a separating rectangular mold 20. The ice cream cake tray 10 is preferably a substantially flat plate with grooves shaped and sized to accept the removable ice cream cake molds. As further illustrated in FIG. 1, cooperating grooves 12 of the cake tray 10 accept the separating rectangular mold 20 illustrated in FIG. 5 and FIG. 7 or the rigid rectangular mold 22 illustrated in FIG. 6 and FIG. 8. As further illustrated in FIG. 1, a cooperating groove 14 of the cake tray 10 accepts the separating circular mold 30 illustrated in FIG. 9 and FIG. 11 or the rigid circular mold 32 illustrated in FIG. 10 and FIG. 12.

Figure 2:
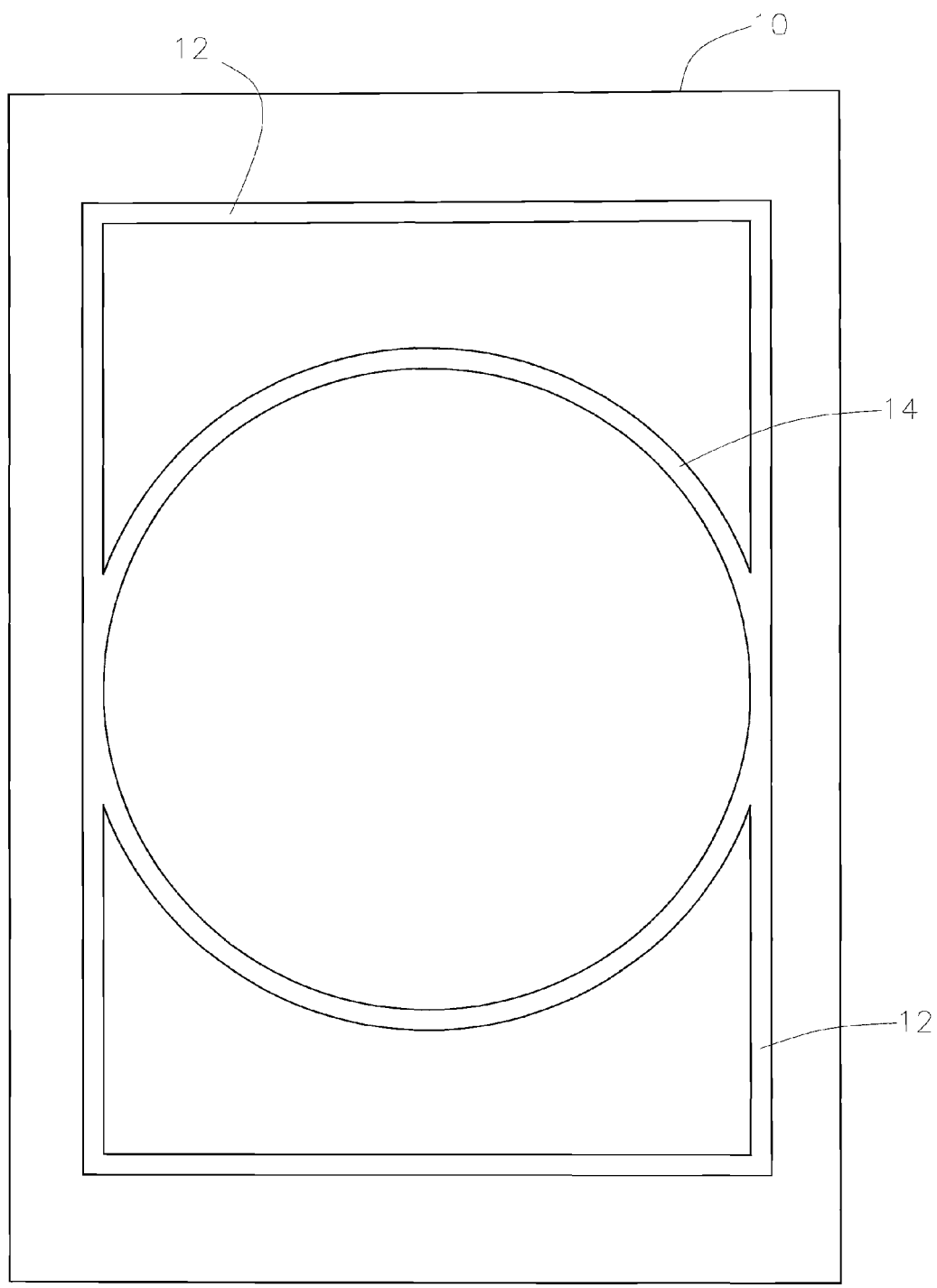
FIG. 2 is a top down view of the ice cream cake tray of the present invention illustrated in FIG. 1.
Figure 3:
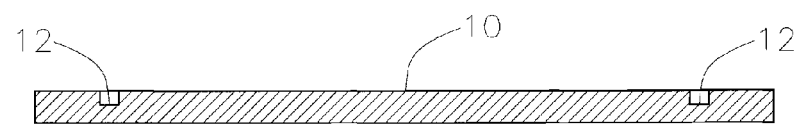
FIG. 3 is a front cross sectional view of the ice cream cake tray of FIG. 2.
Figure 4:
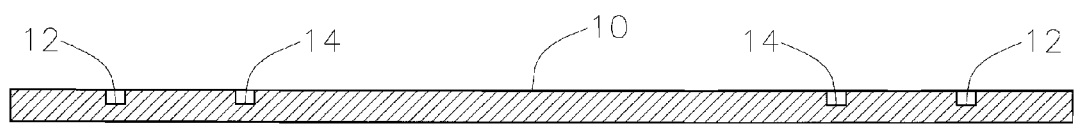
FIG. 4 is a side cross sectional view of the ice cream cake tray of FIG. 2.

With reference to FIG. 1 and FIG. 2, the cooperating grooves 12 and the cooperating groove 14 of the cake tray 10 may, but do not have to, intersect in the surface of the substantially flat plate of the cake tray 10. The cooperating groove 14 for the circular molds 30 and 32 may be shaped so that it is entirely enclosed by the boundaries defined by the cooperating grooves 12 for the rectangular molds. Alternatively, the circular shape defined by the cooperating groove 14 may overlap with the rectangular or square shape defined by the cooperating grooves 12.

The ice cream cake tray 19 preferably serves a dual purpose: it allows the user of the present invention to mold the ice cream cake of a desired shape, size, and content with one of the removable ice cream cake molds, and the ice cream cake tray 10 is also used as a serving tray when it is the time to remove the molds and serve the cake.

Figure 5:
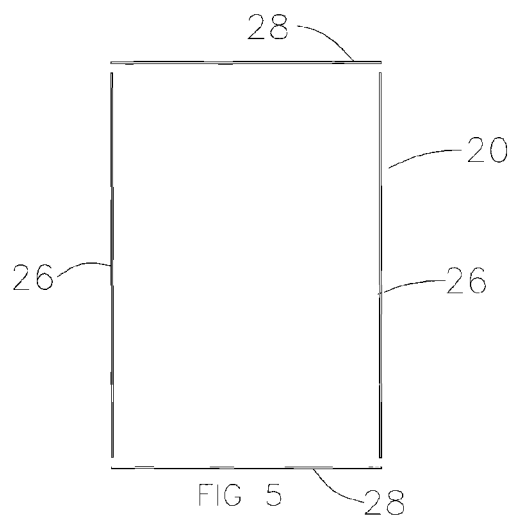
FIG. 5 is a top down view of the separating removable rectangular ice cream rake mold of the present invention illustrated in FIG. 1.
Figure 6:
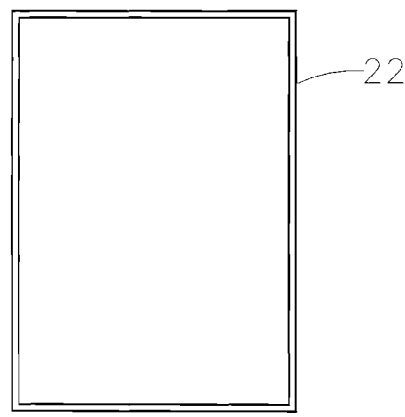
FIG. 6 is a top down view of the one-piece rigid removable rectangular ice cream cake mold of the present invention illustrated in FIG. 1.
Figure 7:
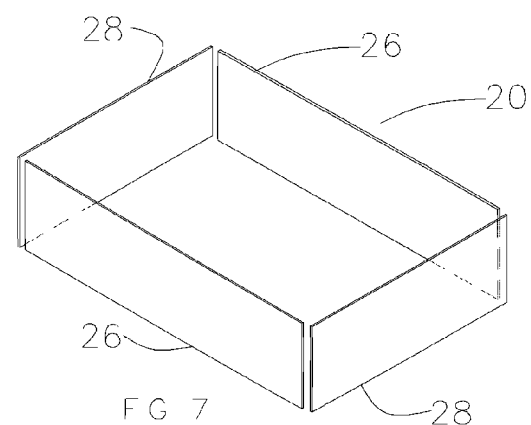
FIG. 7 is a perspective view of the separating removable rectangular ice cream cake mold of the present invention illustrated in FIG. 5.
Figure 8:
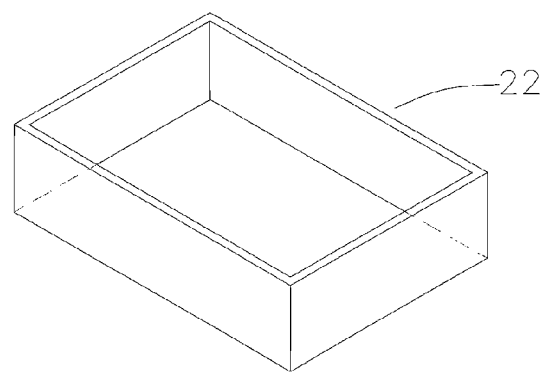
FIG. 8 is a perspective view of the one-piece rigid removable rectangular is cream cake mold of the present invention illustrated in FIG. 6.
Figure 9:
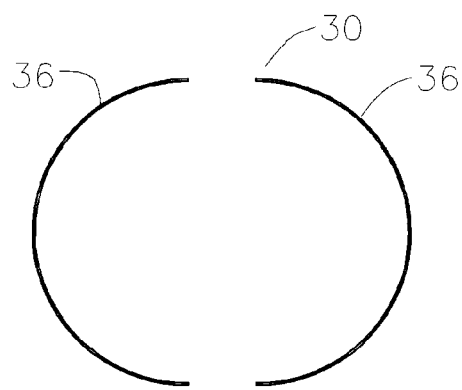
FIG. 9 is a top down view of the separating removable circular ice cream cake mold of the present invention.

The separating rectangular mold 29 is preferably made from four separate parts as illustrated in FIG. 1, FIG. 5, and FIG. 7, including two opposite longitudinal parts 26 and two opposite latitudinal parts 28. Each longitudinal part 26 is thus adjacent to both latitudinal parts 28. However, the separating, rectangular mold 20 may also be made from two or three parts as desired, such as two corner-shaped parts composed on one longitudinal and one latitudinal part each. Likewise, the separating circular mold 30 is preferably made from two parts 36 as illustrated in FIG. 9 and FIG. 11, but it may be made from a greater number of parts if desired.

Figure 11:
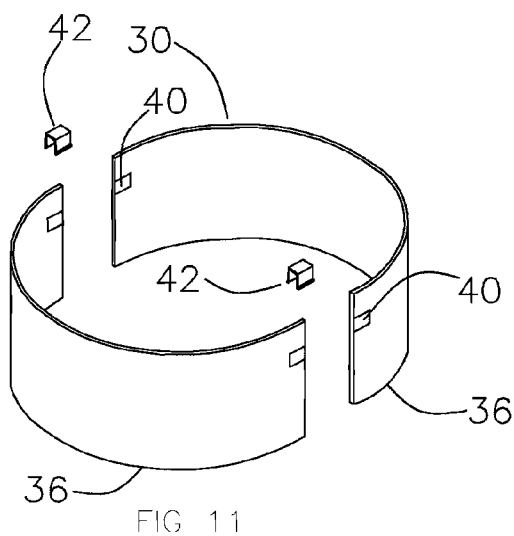
FIG. 11 is a perspective view of the separating removable circular ice cream cake mold of the present invention illustrated in FIG. 9.
Figure 12:
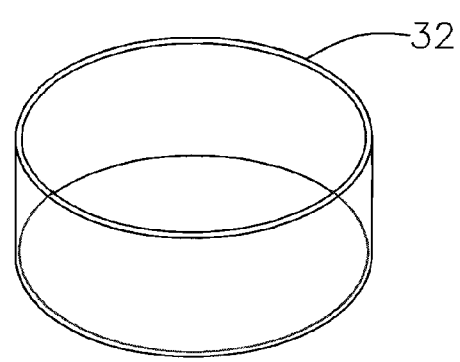

Both the separating rectangular mold 20 and the separating circular mold 30 may employ fasteners 40, as illustrated in FIG. 11, to securely hold the parts of the separating molds in place after the coupling of the separating molds with the ice cream cake tray 10 and during the making of the ice cream cake. Without the fasteners 40 to hold the separate parts of the separating, molds together, the separate parts may he pushed apart when the ice cream is molded and compacted inside the mold, Which is undesirable. The fasteners may be spring clips 42 as illustrated in FIG. 11, pins, latches, hooks, snaps or other fasteners known in the art. The separate parts of the separating molds may also be hinged to each other.

Whenever the rigid rectangular mold 22 is used, it also has two longitudinal sides opposite to each other and two latitudinal sides opposite to each other. The rigid circular mold 32 has a shape of a sleeve or a short hollow tube. However, it is more difficult to remove the rigid molds from the ice cream cake tray 10 after the making of the ice cream cake, without disturbing the cake, due to the friction of the sides of the cake against the walls of the rigid molds. Therefore, whenever rigid molds are used, the inside walls of the rigid molds are preferably smooth to facilitate the removal of the mold without disturbing the ice cream cake.

The preferred embodiment of the invention includes an ice cream cake tray 10 and two removable ice cream molds: a separating rectangular mold 20 and a separating circular mold 30. Alternatively, the invention may include the ice cream cake tray 10, a rigid rectangular mold 22 and a rigid circular mold 32. Any number of combinations of alternative embodiments may be used, employing the ice cream cake tray 10, a polygonal mold, and a non-polygonal mold such as a circular or oval mold. The user selects which mold to attach to the ice cream cake tray 10 depending on what size and shape ice cream cake is desired.

With reference to the drawings, particularly FIG. 1, when the removable ice cream cake mold such as the separating rectangular mold 20 is removably attached to the ice cream cake tray 10 by securing the separating rectangular mold 20 in the cooperating grooves 12, the ice cream cake tray 10 and the separating rectangular mold 20 form a hollow well, where the ice cream cake tray 10 is the bottom of the well and the separating rectangular mold 20 extends upwardly from the ice cream cake tray 10 and comprises the wall or the walls of the well. The connections between the is ice cream cake tray 10 and the separating rectangular mold 20 do not have to be airtight, but the cooperating grooves 12 should be sufficiently well-fitted with the removable ice cream cake mold to avoid any leakage of soft ice cream through during the ice cream cake molding process.

After the attachment of the separating, rectangular mold 20 to the ice cream cake tray 10, the hollow well formed by the ice cream cake tray 10 and the separating rectangular mold 20 is filled with the ice cream and any other desired ingredients or layers. The ice cream is preferably softened before molding the cake because that facilitates faster molding and compacting and ensures a more uniform consistency of the ice cream cake. The ice cream is preferably softened by leaving it outside the freezer for a suitable period of time or by placing it into a microwave oven briefly before it is loaded into the ice cream cake form and molded. Softened ice cream is easier to scoop, load into the form, and mold. Once the ice cream cake is completed, the form with the molded cake is preferably placed into the freezer to refreeze and solidify the ice cream before serving.

There is no preference regarding which edge of the ice cream cake mold is inserted into the ice cream cake tray 10 as the molds are intended to be reversible, without a defined top or bottom. However, if desired, both the separating ice cream cake molds and the rigid ice cream cake molds may have a defined top and bottom so as to facilitate the proper insertion of the bottom of the molds into the respective cooperating grooves 12 or 14.

Although the most practical shape for the ice cream cakes of the present invention are circular and rectangular, a number of other polygonal molds, such as a square, a hexagon, an octagon, a triangle, non-polygonal molds such as an oval, star shapes, or fanciful molds such as a heart shape may be used for the removable ice cream cake molds without departing from the spirit and scope of the present invention. The size and shape of the ice cream cake tray 10 and the removable ice cream cake molds may be varied to accommodate the ice cream cakes of different sizes A kit for making ice cream cakes according to the present invention comprises an ice cream cake tray 10, which is preferably a substantially flat plate with cooperating grooves sized and shaped to accept removable ice cream molds, a round ice cream cake mold, a rectangular ice cream cake mold, and a molding tool 50 for molding and compounding the ice cream cake. Using the molding tool 50 of the present invention is more efficient and more comfortable than using a spoon to compound the ice cream into an ice cream cake.

With reference to the drawings, and particularly FIG. 13 and FIG. 14, the molding tool 50 has a molding part 51 with a bottom surface 52 and a top surface 53, and a handle 54 attached to the top surface 53 of the molding part 51. The top surface 53 may have any shape, but the bottom surface 52 is preferably substantially flat for molding and compacting the ice cream The handle 54 is preferably an elongated handle of a circular cross section, as illustrated in FIG. 13, but the handle 54 could be of another shape and size, such as a C-shaped handle, for example, where the ends of the C-handle are attached to the top surface 53.

The preferred embodiment uses a molding part 51 having a "quarter circle" footprint of the bottom surface 52 as illustrated in FIG. 14. With reference to FIG, 14, the bottom surface 52 is preferably formed by two radiuses of a circle coming out of the circle's center under an approximately ninety degree angle relative to each other, each radius being an edge of the bottom surface 52, and the portion of the circle's perimeter between the ends of the two radiuses. More particularly, the third edge of the bottom surface 52 is curved and is approximately equal to one fourth of the perimeter of the circle defined by the radius. This configuration allows for the most efficient making of the ice cream cakes, where the corner of approximately ninety degrees formed by the two radiuses is used for compacting ice cream in the corners of the square or rectangular ice cream mold 20 or 22, and the curved portion is used for compacting the ice cream in a round ice cream cake mold 30 or 32. Other configurations may also be used with the angle between radiuses being less or more than ninety degrees to accommodate fanciful ice cream molds, such as star shapes, or polygons.

The ice cream cake tray 10, the removable ice cream cake molds, and the molding tool 50 are preferably made from food-grade plastic and may be injection molded or otherwise manufactured as known in the art Other freezer-safe, suitable materials and compounds may also be used to make the ice cream cake tray 10, the removable ice cream cake molds, and the molding tool 50, such as stainless steel, wood, and glass. The corners and the edges of the ice cream cake tray 10 and the ice cream cake molds are preferably rounded and/or smoothed so as to avoid any cut or other injury to the user.

Right before serving the ice cream cake of the present invention, the ice cream cake tray 10 with the attached removable ice cream cake mold and the ice cream cake inside is removed from the freezer. The ice cream cake mold is then gently removed from the ice cream cake tray 10, and the ice cream cake is ready to be cut and served on the ice cream cake tray 10. The preferred embodiment of the present invention uses the separating rectangular mold 20 and the separating circular mold 30 due to the ease with which they may be removed from the tray without disturbing the ice cream cake.

The above description of the disclosed preferred embodiments is provided to enable any person skilled in the art to make or use the invention. Various modifications to these embodiments will be readily apparent to those skilled in the art, and the principles described herein can be applied to other embodiments without departing from the spirit or scope of the invention and the subject matter of the present invention, which is broadly contemplated by the Applicant. The scope of the present invention fully encompasses other embodiments that may he or become obvious to those skilled in the art.

The invention claimed is:

1. A novel ice cream cake kit, comprising:
    (a) a removable polygonal ice cream cake mold;
    (b) a removable non-polygonal ice cream cake mold;
    (c) a substantially flat ice cream cake tray having a set of cooperating grooves shaped and sized to accept the removable polygonal ice cream cake mold and having a cooperating groove shaped and sized to accept the removable non-polygonal ice cream cake mold, wherein one of the removable polygonal ice cream cake mold and the removable non-polygonal ice cream cake mold is user-selectable for removable attachment to the substantially flat ice cream cake tray; and
    (d) a molding tool, comprising:
        (i) a molding part having a top surface and a bottom surface; and
        (ii) a handle coupled with the top surface of the molding part;
    wherein the molding part has a shape substantially defined by a first radius of a circle and a second radius of the circle, each radius having a center end and a distal end, wherein the center end of the first radius and the center end of the second radius meet, and a part of a perimeter of the circle between the distal end of the first radius and the distal end of the second radius, and the first radius of the circle and the second radius of the circle are at an approximately ninety-degree angle relative to each other.

2. A novel ice cream cake kit of claim 1, wherein the bottom surface of the molding part is substantially flat.

3. A novel ice cream cake kit of claim 1, wherein the handle of the molding tool is adopted to be held by a user.

4. A novel ice cream cake kit of claim 1, wherein the bottom surface of the molding part is adopted to mold ice cream in the removable polygonal ice cream cake mold or the removable non-polygonal ice cream cake mold.

5. A novel ice cream cake kit, comprising:
    (a) a removable polygonal ice cream cake mold;
    (b) a substantially flat ice cream cake tray having a set of cooperating grooves shaped and sized to accept the removable polygonal ice cream cake mold, wherein the removable polygonal ice cream cake mold is adopted for removable attachment to the substantially flat ice cream cake tray; and
    (c) a molding tool, comprising:
        (iii) a molding part having a top surface and a bottom surface; and
        (iv) a handle coupled with the top surface of the molding part;
    wherein the molding part has a shape substantially defined by a first radius of a circle and a second radius of the circle, each radius having a center end and a distal end, wherein the center end of the first radius and the center end of the second radius meet, and a part of a perimeter of the circle between the distal end of the first radius and the distal end of the second radius, and the first radius of the circle and the second radius of the circle are at an approximately ninety-degree angle relative to each other.

6. A novel ice cream cake kit of claim 5, wherein the bottom surface of the molding part is substantially flat.

7. A novel ice cream cake kit of claim 5, wherein the handle of the molding tool is adopted to be held by a user.

8. A novel ice cream cake kit of claim 5, wherein the bottom surface of the molding part is adopted to mold ice cream in the removable polygonal ice cream cake mold.

9. A novel ice cream cake kit, comprising:
    (a) a removable non-polygonal ice cream cake mold;
    (b) a substantially flat ice cream cake tray having a cooperating groove shaped and sized to accept the removable non-polygonal ice cream cake mold, wherein the removable non-polygonal ice cream cake mold is adopted for removable attachment to the substantially flat ice cream cake tray; and
    (c) a molding tool, comprising:
        (v) a molding part having a top surface and a bottom surface; and
        (vi) a handle coupled with the top surface of the molding part;
    wherein the molding part has a shape substantially defined by a first radius of a circle and a second radius of the circle, each radius having a center end and a distal end, wherein the center end of the first radius and the center end of the second radius meet, and a part of a perimeter of the circle between the distal end of the firs radius and the distal end of the second radius, and the first radius of the circle and the second radius of the circle are at an approximately ninety-degree angle relative to each other.

10. A novel ice cream cake kit of claim 9, wherein the bottom surface of the molding part is substantially flat.

11. A novel ice cream cake kit of claim 9, wherein the handle of the molding tool is adopted to be held by a user.

12. A novel ice cream cake kit of claim 9, wherein the bottom surface of the molding part is adopted to mold ice cream in the removable non-polygonal ice cream cake mold.

\* \* \* \* \*